Oct. 21, 1947.  J. S. RESTARSKI ET AL  2,429,238
REFRIGERATION APPARATUS FOR INDUCING LOCAL ANESTHESIA
Filed Oct. 30, 1944   2 Sheets-Sheet 1
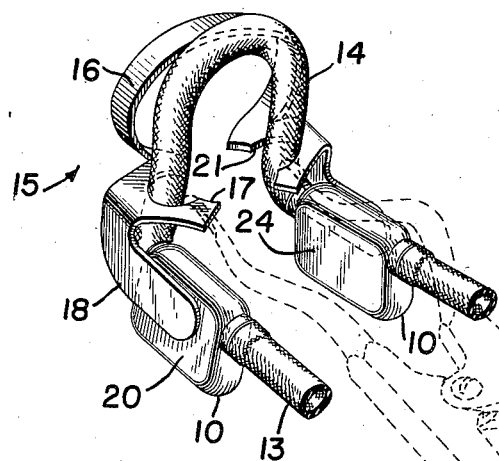
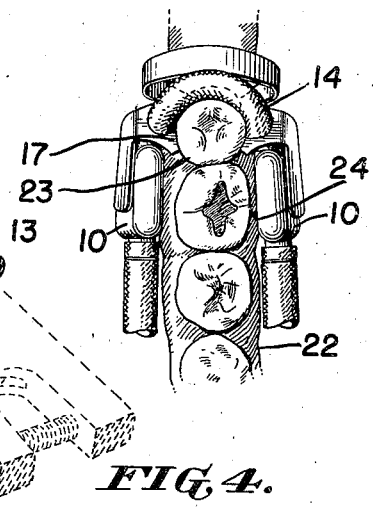
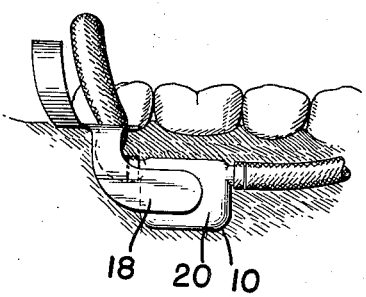
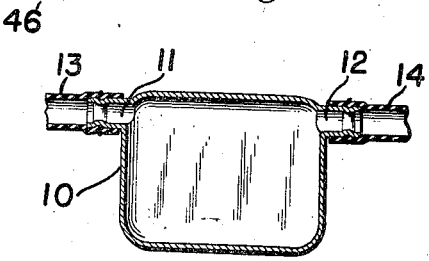
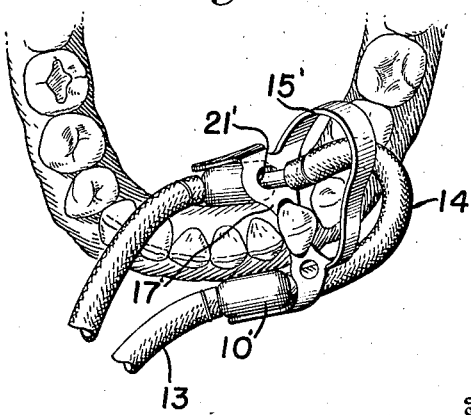
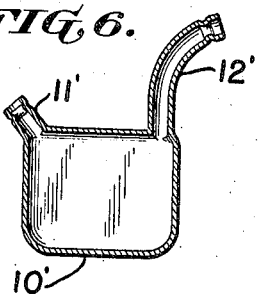
Inventors
J. S. Restarski
and A. P. Black.
By
Attorney

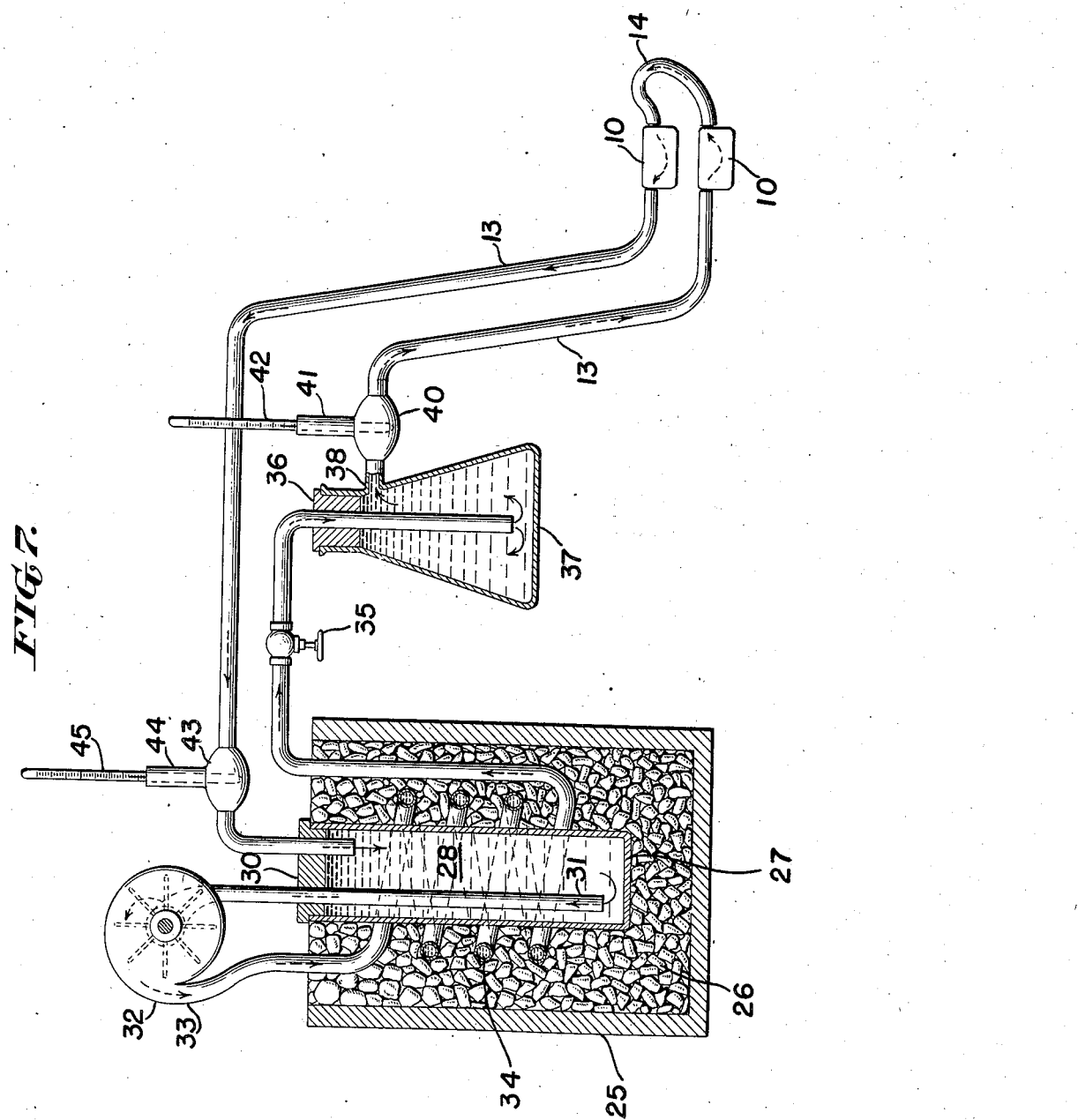

Patented Oct. 21, 1947

2,429,238

UNITED STATES PATENT OFFICE 2,429,238

REFRIGERATION APPARATUS FOR INDUCING LOCAL ANESTHESIA

Joseph S. Restarski and Arthur P. Black,
United States Navy

Application October 30, 1944, Serial No. 561,142

1 Claim. (Cl. 128—400)

(Granted under the act of March 3, 1883, as amended April 30, 1928; 370 O. G. 757)

This invention relates to a method and apparatus for inducing local anesthesia and has for an object to provide an improved method and apparatus for inducing anesthesia locally in any part of the body and particularly for producing dental anesthesia.

A further object of this invention is to provide a method and apparatus for providing a local anesthesia which, while it will be described in connection with dental anesthesia permitting oral operations, is also intended for use in connection with local anesthesia on various parts of the body, as the limbs, fingers, or other areas wherever a small operative area or portion of the body may be conveniently subjected to the anesthetic effect of local refrigeration.

A further object of this invention is to provide a method and apparatus for subjecting any area and particularly the dental area of the human body to local refrigeration close to the freezing point, thereby permitting the refrigerated operative area to be painlessly operated upon without shock to the patient or injury to any of the tissues from the refrigeration.

A further object of this invention is to provide a method and apparatus for gradually lowering the temperature to the refrigerating temperature which provides the anesthesia and thereafter gradually raising the temperature to the normal temperature, thereby eliminating any pain as a result of an abrupt change in temperature.

With the foregoing and other objects in view, the invention consists in the construction, combination and arrangement of parts hereinafter set forth, claimed and illustrated in the drawings in which:

Fig. 1 is a perspective view of the refrigeration applicators of this invention.

Fig. 2 is a top plan view of the applicators of this invention applied to the external and internal gingival surfaces of the maxilla or the mandible.

Fig. 3 is a side view of Fig. 2.

Fig. 4 is a sectional view through one of the applicators.

Fig. 5 is a top plan view of a slightly modified form of applicator and holder.

Fig. 6 is a sectional view of the applicator of Fig. 5, and

Fig. 7 is a partly sectional, partly elevational view of the refrigerant circulating apparatus of this invention.

There is shown at 10 a refrigerant applicator of this invention which consists of a small enclosed vessel having entrance and exit ports 11 and 12. The applicator will be shaped to conform to the portion or operative area of the patient to which it is to be applied. The applicators herein shown are generally intended to be used as gingival applicators although the same applicators can obviously be used on a finger or other small area of the patient. When used as gingival applicators the applicator 10 as shown is substantially flat and has the entrance and exit ports 11 and 12 located adjacent the upper edge thereof. These applicators 10 may be made of a semi-flexible material such as thin sheet copper or silver or any other suitable semi-flexible metal or material having good heat conducting properties. Flexible tubings 13 and 14 are connected to the ports 11 and 12 for conducting a refrigerant to and from the applicator 10.

As shown in Figs. 2 and 3, a pair of applicators 10 are used on the interior and exterior gingival surfaces, being held in such operative area by means of the holder 15. This holder 15 consists of a contractal spring portion 16 having dental embracing fingers 17 and flat spring extensions 18 adapted to be pressed against the outer surfaces 20 of the gingival applicators 10. The fingers 17 are recessed as at 21 so as to permit the refrigerant tube 14 to connect the two applicators on the opposite sides of the gingival surfaces 22, the applicator holder fingers 21 being intended to grasp on the opposite sides of a molar 23. As a result of such construction the holder 15 presses the inner surfaces 24 in firm contact with the gingival surfaces 22 whereby a refrigerant 28 circulating through the tubes 13 and applicators 10 by way of the connecting tube 14 will conduct heat away from the gingival surfaces 22.

In the form shown in Figs. 5 and 6 the applicator 10' is provided with angularly extending ports 11' and 12', the port 12' being an extended neck as shown for cooperation with the applicator connecting tube 14, also the applicator holder 15' is provided with dental embracing fingers 17' which are provided with apertures 21' through which the applicator port necks 12' extend for receiving the connecting tube 14.

The refrigerating unit for circulating a refrigerant through the applicators 10 is shown in Fig. 7. This refrigerating unit may consist of an outer chamber 25 adapted to receive a refrigerating mixture 26 of crushed ice and salt and an inner refrigerant chamber 27. The chamber 27 acts as a reservoir for the refrigerant 28, a preferred refrigerant consisting of about 65% water and 35% ethyl alcohol. Extending through a stopper 30 on the chamber 27 is a tube 31 connecting to a circulating pump 32 whose outlet 33 is connected to a glass or copper coil 34. This coil 34 is wound about through the refrigerating mixture 26 within the outer chamber 25 and leads past a control valve 35 through a stopper 36 to the bottom of a flask 37. Flask 37 is provided with an outlet port 38 near its top to which is connected a bulbular member 40, which in turn is connected to one of the applicator tubes 13.

The bulbular member 40 is provided with a chimney 41 through which is extended a thermometer 42, the thermometer 42 preferably fitting snugly into the chimney 41 to prevent any leakage therethrough. The refrigerant reaching the first applicator 10 goes through connecting tube 14 to the second applicator 10 in the direction shown by the various arrows thereon and thence returns by the second tube 13 to the second bulbular member 43 with its chimney 44 and thermometer 45 and through the stopper 30 back into the refrigerant reservoir chamber 27.

In operation, the applicators 10 are held in position on the gingival surfaces 22 adjacent the root of the tooth to be operated upon as shown in Figs. 2 and 5. They may be placed in position by means of the conventional rubber dam clamp forceps 46, it being observed that the holder 15 is similar to a conventional rubber dam clamp except as modified herein to hold the applicators instead of a rubber dam. The refrigerant 28 in the reservoir chamber 27 and coil tube 34 are at or close to the freezing temperature. The flask 37 is continuously exposed to room temperature and the refrigerant and the applicators and tubes 13 will be at room temperature at the commencement of the operation.

As pump 32 is operated, the refrigerant will circulate in the direction of the arrows, the refrigerant in the flask 37 cooling gradually, the speed with which it is cooled being determined both by the speed of the pump 32 and the control valve 35. The operator will watch the first thermometer 42 so as to control the lowering of the temperature in the refrigerant passing through the applicators 10 until it has reached the desired low temperature of about zero to two degrees centigrade, that is, just at or above the freezing temperature. By a suitable control of the pump 32 and of the valve 35, the temperature of the refrigerant 28 leaving the flask 37 may be maintained at the desired temperature. A slow drop of temperature of the refrigerant 28 passing through the applicators 10 avoids any pain in the gingival tissues such as is often caused by any sudden change in temperature. The second thermometer 45 will reach a temperature of about one degree higher than the temperature indicated on the first thermometer 42 and will generally maintain this one degree differential as long as the refrigerant is circulated.

After the gingival tissues have been thus cooled, it will be found that local anesthesia has been induced and drilling or other operative procedure may be performed without pain to the patient. It has been found that it takes an average of four or five minutes to obtain effective anesthesia and thereafter that the temperature of zero to two degrees centigrade may be maintained safely without any injury to any of the oral tissues for a sufficient time for drilling or other operative procedure to be carried out. It has been determined experimentally that no harm or injury is caused to any tissues maintained slightly above freezing up to four hours or more although an average of about ten to twenty minutes is all that is usually needed in dental operations. After the drilling or operative procedure is completed, the pump 32 is stopped, discontinuing its circulation, but the gingival applicators 10 are left in position for a while, however, until the refrigerant therein gradually warms up, as the gingival tissues gradually warm up to normal temperature, thus slowing up the return of the normal temperature and preventing any pain-causing sudden change in temperature. When the normal temperature is reached, the applicators are removed without leaving any after pains.

Other modifications and changes in the number and arrangement of the parts may be made by those skilled in the art without departing from the nature of this invention, within the scope of what is hereinafter claimed.

The invention herein described and claimed may be manufactured and used by or for the Government of the United States of America for governmental purposes without the payment of any royalties thereon or therefor.

What is claimed is:

In an apparatus for inducing dental anesthesia by local refrigeration, a gingival applicator means comprising a pair of flattened hollow vessels of good thermal conductivity, refrigerant inlets and outlets at opposite ends of said vessels, and means for holding said vessels on the gingival tissues comprising a holder and flattened spring arms adapted to press said applicator vessels against the gingival tissues, said holder having tooth embracing fingers for securing said holder in position.

JOSEPH S. RESTARSKI.
ARTHUR P. BLACK.

REFERENCES CITED

The following references are of record in the file of this patent:

UNITED STATES PATENTS

| Number | Name | Date |
|---|---|---|
| 39,673 | Oudry | Aug. 25, 1863 |
| 1,902,016 | Copeman | Mar. 21, 1933 |
| 787,920 | Hofmann | Apr. 25, 1905 |
| 1,011,606 | Fulton | Dec. 12, 1911 |

OTHER REFERENCES

General Catalog of S. S. White Dental Mfg. Co., page 148, Clamp 206.